US005754031A

United States Patent [19]
Kanazawa et al.

[11] Patent Number: 5,754,031
[45] Date of Patent: May 19, 1998

[54] VEHICULAR ELECTRIC POWER GENERATING SYSTEM

[75] Inventors: Wakako Kanazawa, Toyokawa; Fuyuki Maehara; Yasuhiro Takase, both of Kariya, all of Japan

[73] Assignee: Nippondenso Co., Ltd., Kariya, Japan

[21] Appl. No.: 691,144

[22] Filed: Aug. 1, 1996

[30] Foreign Application Priority Data

Aug. 8, 1995 [JP] Japan ............................ 7-202450

[51] Int. Cl.⁶ ........................................................ H02P 9/14
[52] U.S. Cl. ............................................... 322/28; 322/46
[58] Field of Search ............................... 322/22, 28, 29

[56] References Cited

U.S. PATENT DOCUMENTS

| | | | |
|---|---|---|---|
| 4,079,306 | 3/1978 | Mori et al. | 322/28 |
| 4,409,539 | 10/1983 | Nordbrock et al. | 322/28 |
| 4,803,376 | 2/1989 | N'Guyen | 290/22 |
| 5,177,391 | 1/1993 | Kusase | 310/263 |
| 5,214,371 | 5/1993 | Naidu | 322/29 |
| 5,502,368 | 3/1996 | Syverson et al. | 322/28 |
| 5,550,457 | 8/1996 | Kusase et al. | 322/29 |
| 5,608,616 | 3/1997 | Umeda et al. | 363/132 |

FOREIGN PATENT DOCUMENTS

| | | |
|---|---|---|
| 63-265600 | 11/1988 | Japan . |
| 3-23837 | 5/1991 | Japan . |
| 6-276796 | 9/1994 | Japan . |
| 6-284598 | 10/1994 | Japan . |

*Primary Examiner*—Steven L. Stephan
*Assistant Examiner*—Nicholas Ponomarenko
*Attorney, Agent, or Firm*—Cushman Darby & Cushman IP Group of Pillsbury Madison & Sutro LLP

[57] ABSTRACT

The rotor of a generator is provided with permanent magnets to ensure start-up of electricity generation without externally supplied field current after a vehicle engine starts. When the generation is detected, the external field current is supplied from a battery so that the battery is charged by the generator, thereby to prevent battery discharge in a low speed range.

11 Claims, 6 Drawing Sheets

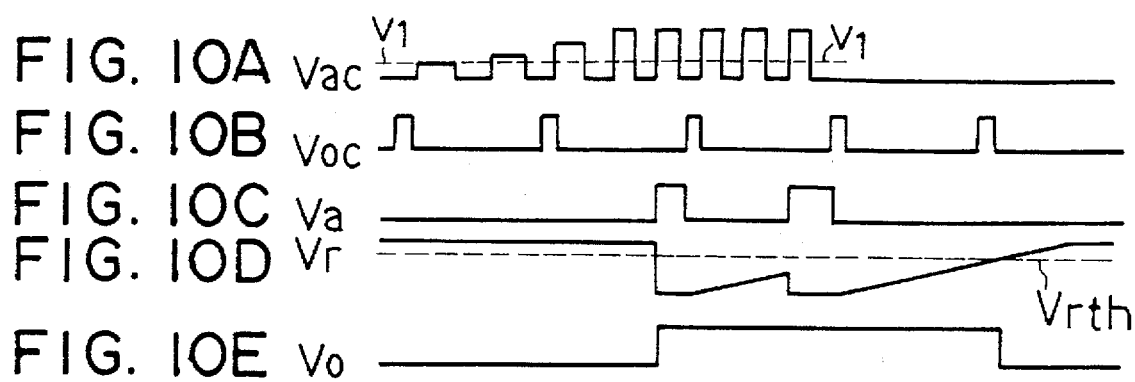

VEHICULAR ELECTRIC POWER GENERATING SYSTEM

CROSS REFERENCE TO RELATED APPLICATION

The present application is based on and claims priority from Japanese patent Application No. Hei 7-202450, filed on Aug. 8, 1995, the contents of which are incorporated herein by reference.

BACKGROUND OF THE INVENTION

1. Field of the Invention

The present invention relates to an electric power generating system for a vehicle which has a separate excitation type generator having a battery-powered-field-coil and, more particularly, a vehicular electric power generator whose exciting coil is supplied with an exciting current from a battery when the generator starts generation.

2. Description of the Related Art

In the above-stated separate excitation type generator, because the exciting current is supplied to the field coil from a battery, the power generation is much faster than that of the self-excitation type generator. The former is supplied with sufficient amount of the exciting current even in a low speed range, thereby generating a sufficient electric power. However, such separate excitation type generator needs the exciting current before it generates sufficient power to charge the battery.

JP-A6-276796, which was filed by the same assignee as the present application, proposes a separate excitation type generator in which the exciting current is supplied to the field coil only when generation by the remanent field of the magnetic poles is detected.

However, because the remanent field of the magnetic poles of the above described generator is not sufficient to provide a stable start-up rotational speed (a rotational speed where the generator starts generation without external current supply), a stable battery charging speed is not ensured, resulting in unexpected battery discharge.

SUMMARY OF THE INVENTION

Therefore, a main object of the present invention is to provide an improved vehicular electric power generating system having a separate excitation type generator which ensures a stable battery charging speed as well as increased electric power.

Another object of the present invention is to provide a vehicular electric power generation system which comprises: an engine-driven generator having a rotor which has a permanent magnet for supplying magnetic flux to the stator thereby ensuring rise-up of generation at a low speed range; means for detecting that generation starts (i.e., that the generated voltage rises to a stable operational voltage level) means for supplying a field current to the field coil only when the, the start-up Voltage level is detected; and a voltage regulator for regulating an output voltage of the generator to a predetermined voltage by controlling the field current.

The above rotor preferably comprises a plurality of claw poles extending axially from opposite ends so that claw poles of one polarity (e.g. N pole) mesh claw poles of the other polarity (e.g. S pole) alternately; and the permanent magnet is disposed in a space between the claw poles so as to prevent leakage magnetic flux generated by the field coil through the space.

The detecting means preferably comprises a voltage detecting means for detecting a voltage generated in one of the phase windings. The voltage detecting means generates a signal when the voltage of the phase winding exceeds a reference voltage, when the voltage of the phase winding exceeds a reference voltage and decreases to a voltage lower than the reference voltage in a predetermined period or when the frequency of the phase voltage exceeds a predetermined number. The detecting means preferably comprises a detecting coil disposed in the same portion as the one of the phase windings.

The field current supplying means preferably cuts the field current when the phase voltage stays lower than a reference voltage for a predetermined time.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 8A, 8B and 8C are timing charts showing voltage wave shapes on portions shown in FIG. 7;

FIGS. 10A, 10B, 10C, 10D and 10E are timing charts showing voltage wave shapes on portions shown in FIG. 9.

Figure 1:
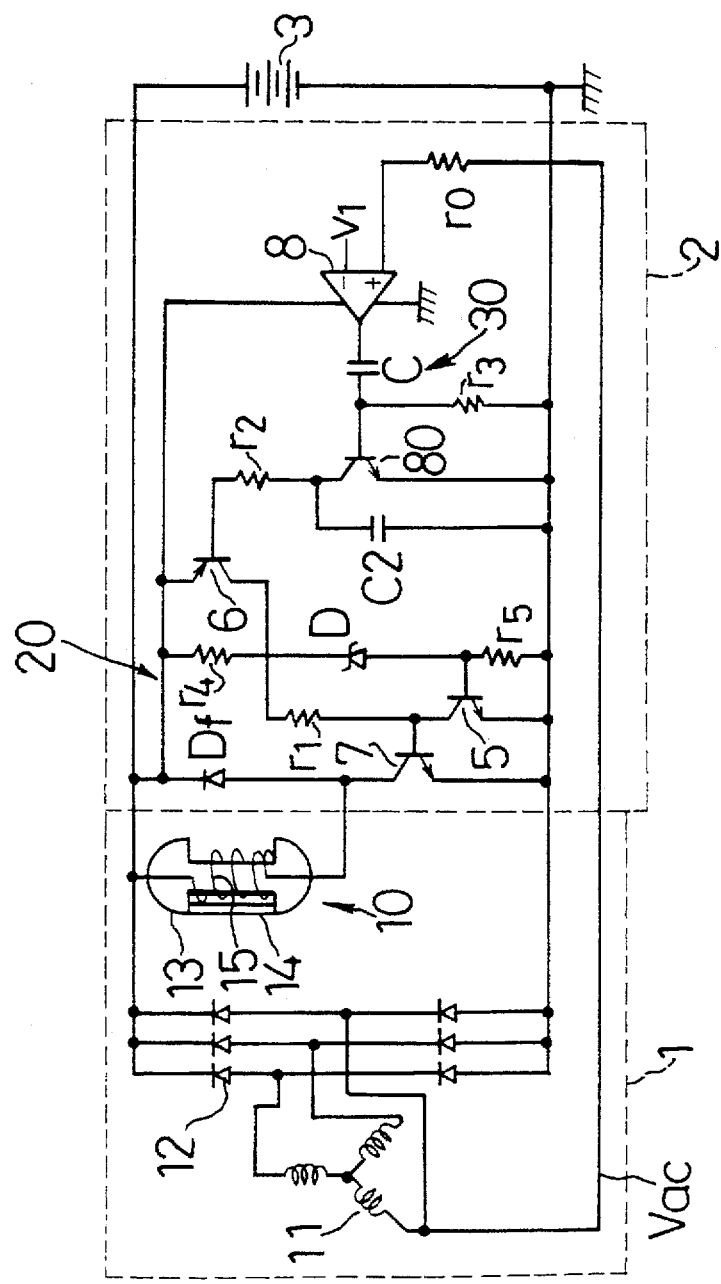
FIG. 1 is a circuit diagram of a vehicular electric power generation system according to a first embodiment of the present invention.
Figure 2:
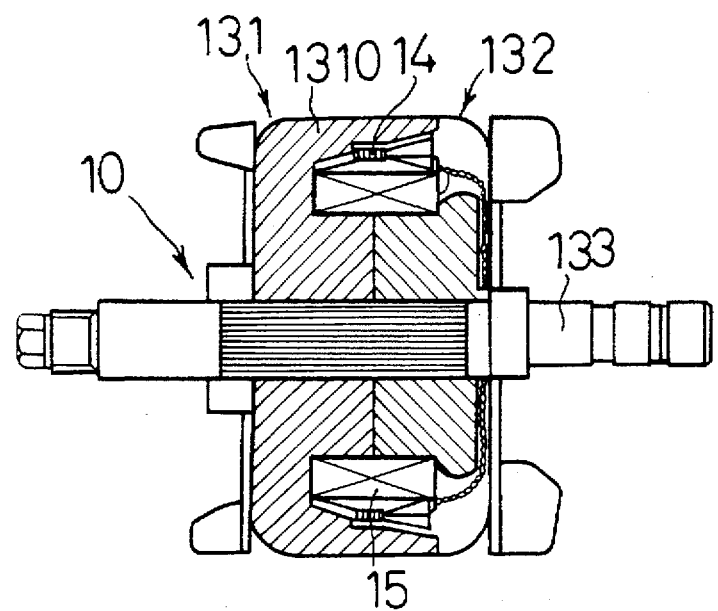
FIG. 2 is a cross-sectional view illustrating a rotor of a generator shown in FIG. 1.

DETAILED DESCRIPTION OF THE PREFERRED EMBODIMENTS (First Embodiment)

A first embodiment is described with reference to FIGS. 1 to 4.

An electric power generating system is composed of a generator 1 and a regulator 2 which regulates voltage of electric current generated by the generator 1 to be charged to a battery 3.

The generator 1 has a rotor 10 and a stator (not shown) and a three-phase-full-wave rectifier 12. The rotor 10 is composed of a Lundell type rotor core 13, a field exciting coil or field coil 15 which is wound around a cylindrical portion of the rotor core 13 and permanent magnets 14 disposed in the rotor core 13. The stator is composed of a stator core (not shown) and three-phase stator windings or armature windings 11 wound around the teeth of the stator core. The three-phase AC currents generated at respective terminals of the stator windings 11 are rectified by the three-phase-full-wave rectifier 12 and charged to the battery 3.

The regulator 2 has a comparator 8, and a single phase voltage Vac of one of the three-phase stator windings 11 is applied to the positive input terminal of the comparator 8 through a resistor ro, which is compared with a reference voltage V1. The reference voltage is set at 0.7 V so that the comparator supplies the base of a transistor 80 with a high level voltage (current supply signal) through a capacitor C when the phase voltage Vac becomes higher than 0.7 V. The emitter of the transistor 80 and, through a resistor r3, the base thereof are connected to the minus terminal of the battery 3 and a ground. The capacitor C and the resistor r3 form a differentiating circuit 30.

The transistor 80 turns on just after the comparator 8 generates the high level voltage. As the capacitor C is charged gradually, the base potential of the transistor 80 lowers gradually. The transistor 80 turns off when a time period decided by the time constant, which is a function of the capacitor C and the resistor r3, has passed.

As long as the transistor 80 stays conductive, the base of a pnp transistor 6 is grounded through a resistor r2. When the transistor 80 turns off, the base current of the transistor 6 continues to flow through a capacitor C2 which is connected across the emitter and collector thereof during a time period decided by the resistor r2 and the capacitor C2, thereby holding the transistor 6 conductive until the above time period is over.

An end of the field coil 15 is connected to the plus terminal of the battery 3 and the other end thereof is connected to the collector of a switching transistor 7 whose emitter is grounded. A flywheel diode Df is connected across both terminals of the field coil 15.

The base of the switching transistor 7 is connected to the collector of the transistor 6 through a resistor r1 and to the collector of the transistor 5 directly. The emitter of the transistor 5 is grounded and the base thereof is connected to the anode of a constant voltage diode D. The anode of the constant voltage diode D is grounded through a resistor 5 and the cathode of the same is connected through a resistor r4 to the plus terminal of the battery 3. If the battery voltage becomes excessively high, a current flows through the constant voltage diode D and the resistor r5. If the voltage drop across the resistor 5 becomes no less than 0.65 V, the transistor 5 turns on thereby to turn off the transistor 7 to cut the field current supplied to the field coil 15.

The permanent magnets 14 are disposed in the spaces between oppositely polarized claw-poles which are alternately disposed on the periphery of the Lundell type rotor core 13. The permanent magnets 14 are magnetized respectively in directions to increase the effective magnetic flux of the field coil 15 (to interlink the stator windings 11).

When an engine (not shown) starts, the rotor core 13 and the magnetic flux of the permanent magnets 14 are rotated to generate voltages in the stator windings.

When the phase voltage Vac is lower than a reference voltage V1, the transistors 80, 6 and 7 are nonconductive and the field current is not supplied to the field coil 15, thereby preventing the battery discharge. When the phase voltage Vac becomes higher than the reference voltage V1, the comparator 8 outputs a rectangular wave voltage, which is differentiated and applied to the base of the transistor 80 so that the transistor 80 turns on cyclically or continuously. If the transistor 80 is turned off in a short time, the transistor 6 is held conductive because of the capacity C2 thereby to hold the transistor 7 conductive so that the current supply to the field coil starts.

When the engine stops and the rotor core 13 with the permanent magnets 14 stops, the comparator 8 outputs a low level signal to turn off all the transistors 80, 6 and 7 to prevent the battery discharge due to the current supply to the field coil.

When the rectified output voltage becomes excessively high, a current flows through the resistor r4, the zener diode D and the resistor r5 to turn on the transistor 5, which lowers the potential of the base of the transistor 7 to turn off the switching transistor 7, thereby regulating the battery voltage to a constant level.

In this embodiment, since the permanent magnets 14 ensure an increase of the phase voltage Vac, a stable start-up rotational speed can be provided regardless of the shape of the rotor core 13 and variation of the generator characteristics.

Further, even if any element of the rectifier 12 is broken, and a current leaks from the battery 3 through the stator windings 11 to the comparator 8, differentiating circuit 30 prevents the transistor 80 from turning on so that the switching transistor 7 may not turn on. If a minus noise voltage is applied to the transistor 80 to turn off, the capacitor C2 holds the transistor 6 conductive for a while, thereby preventing the switching transistor 7 from turning off.

Figure 3:
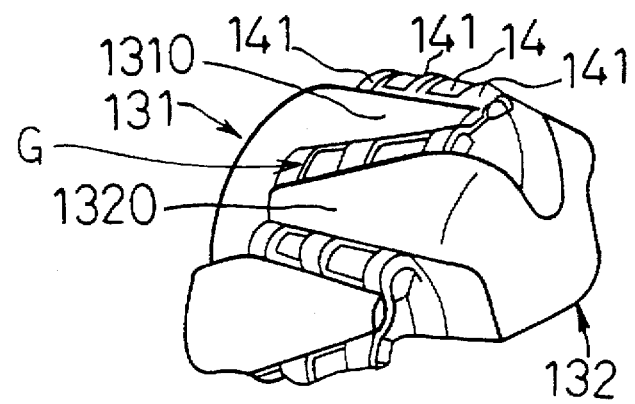
FIG. 3 is a fragmentary perspective view of the rotor illustrated in FIG. 2.

The rotor core 13 is composed of a left core 131 and a right core 132 which are secured to a shaft 133. The permanent magnets 14 in this embodiment are rod-like ferrite magnets. As shown in FIG. 3, each of the magnets 14 is secured in a nonmagnetic holder 141, disposed circumferentially in a space G between the claw pole 1310 of the left core 131 and the claw pole 1320 of right core 132 and fixed by an adhesive agent to the side surfaces of the claw poles 1310 and 1320. If the claw poles 1310 of the left core are polarized by the field current into N pole and the claw poles 1320 of the right core 132 are polarized into S pole, one ends of the permanent magnets 14 in contact with the claw poles 1310 (N pole) are magnetized into N pole and the other ends thereof are magnetized into S pole. It is not always necessary that the permanent magnets 14 are disposed in all the spaces G between the adjacent claw poles.

Figure 4:
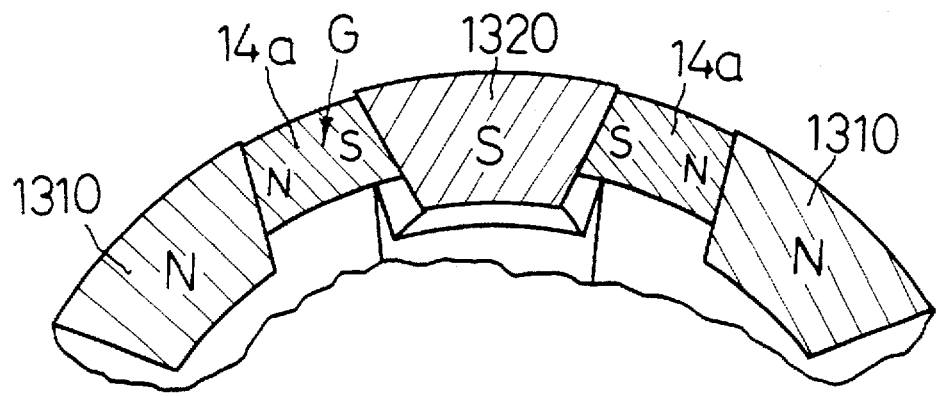
FIG. 4 is a variant of the rotor illustrated in FIG. 2.

As shown in FIG. 4, each of the spaces G between the claw poles 1310 and 1320 has width (in the circumferential direction) which decreases toward the outside in the radial direction so that the permanent magnets may be held surely.

A resistor r0 of the circuit diagram shown in FIG. 1 may be omitted.

(Second Embodiment)

Figure 5:
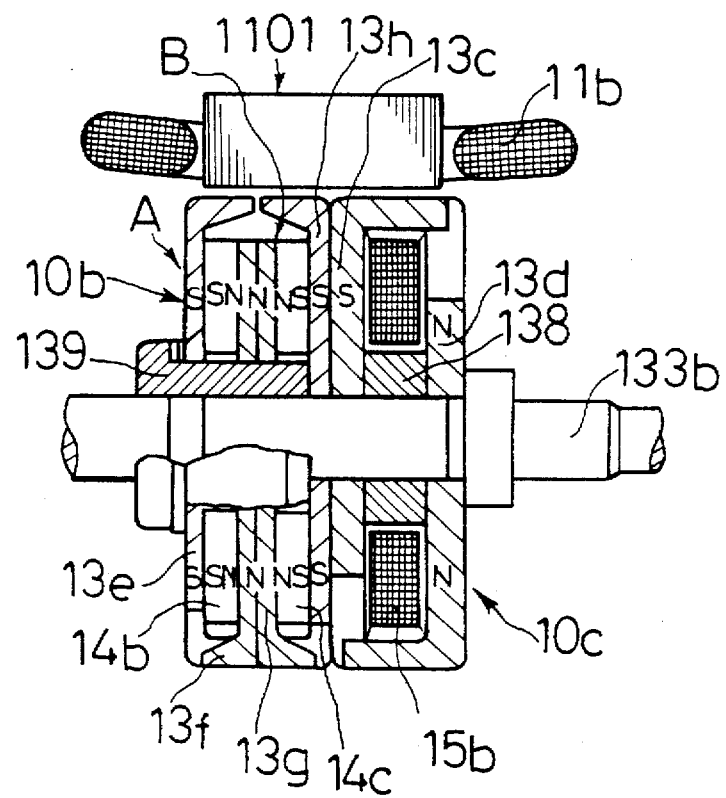
FIG. 5 is a cross-sectional view illustrating a rotor of a generator of an electric power generating system according to a second embodiment of the present invention.

A second embodiment is described with reference to FIG. 5.

Only the rotor is different from the rotor 10 of the generator according to the first embodiment. The rotor is composed of a permanent magnet rotor 10b and an exciting-coil type rotor 10c, which are carried tandem by a shaft 133b. Stator windings 11b of a stator 1101 are wound so that the magnetic fluxes of both rotors 10b and 10c. The exciting-coil type rotor 10c is almost the same as the rotor 10 of the generator according to the first embodiment, and has left and right cores 13c and 13d, a field coil 15b and a magnetic yoke 138.

On the other hand, the permanent magnet rotor 10b is composed of a rotor half A and a rotor half B carried tandem by the shaft, and also a magnetic yoke 139. The rotor half A has permanent magnets 14b which are disposed between a left core 13e and a right core 13f. The rotor half B has permanent magnets 14c which are disposed between a left core 13g and a right core 13h. The magnetic yoke 139 functions to hold components of the permanent magnet rotor 10b including the left cores 13e and 13g and right cores 13f and 13h in the axial direction. Each corresponding pole of the exciting-coil type rotor, the rotor half A and the rotor half B is polarized to the same polarity.

The operation of the generator according to the second embodiment is substantially the same as the first embodiment.

(Third Embodiment)

Figure 6:
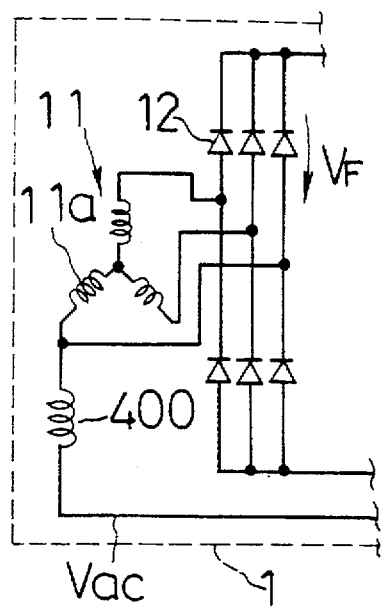
FIG. 6 is a circuit diagram of a generator according to a third embodiment of the present invention.

An electric power generating system according to a third embodiment is described with reference to FIG. 6.

A detecting coil 400 is wound in the same slots as a phase winding 11a of the generator 1 of this system and connected in series with the phase coil 11a. Other portions are the same as the first embodiment. The detecting coil 400 functions to increase the phase voltage Vac.

(Fourth Embodiment)

Figure 7:
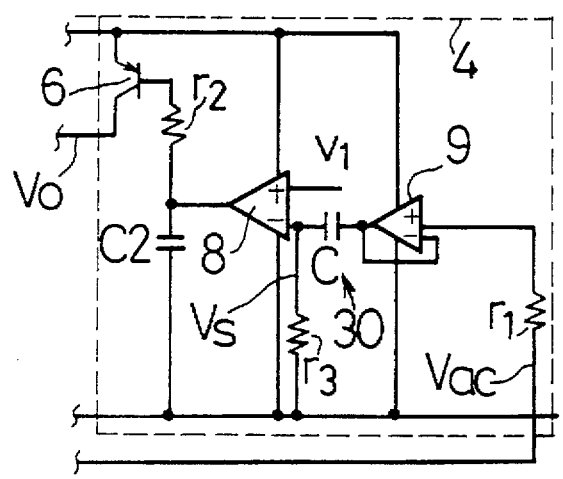
FIG. 7 is a circuit diagram of a portion of a regulator of an electric power generating system according to a fourth embodiment of the present invention.
Figure 9:
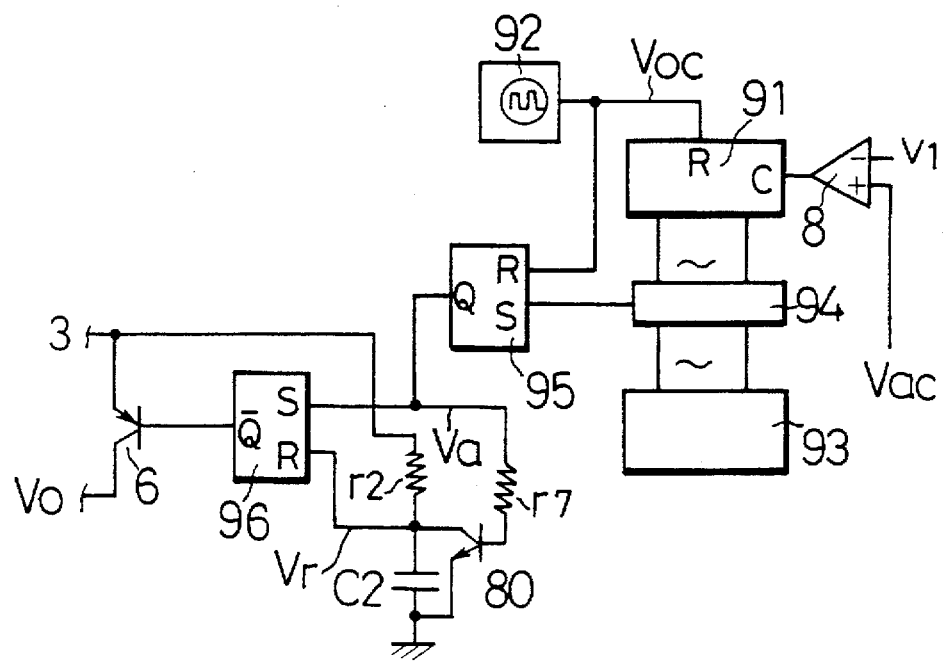
FIG. 9 is a circuit diagram of a regulator of an electric power generating system according to a fifth embodiment of the present invention.

An electric power generating system according to a fourth embodiment is described with reference to FIGS. 7 to 9.

The differentiating circuit 30 of this system is connected in front of the comparator 8 and a voltage follower 9 is connected in series with the capacitor C of the differentiating circuit 30 so that the transistor 80 of the first embodiment can be omitted. Since the phase voltage Vac is differentiated before it is converted into the binary code, the detection sensitivity is increased.

The phase voltage Vac is amplified by the voltage follower 9 and differentiated to obtain a differentiated voltage Vs as shown in FIG. 8A and 8B. When the voltage Vs exceeds the reference voltage V1, the comparator 8 outputs the low level signal, and the capacitor C2 discharges to turn on the transistor 6, thereby changing the output voltage Vo to the high level voltage. The differentiated voltage Vs soon becomes lower than the reference voltage V1 and the comparator 8 outputs the high level voltage. However, the output voltage Vo of the transistor 6 keeps the high level voltage until the capacitor C2 is fully charged.

If the rectifier is broken, the differentiated voltage Vs can not exceed the reference voltage V1, thereby preventing the output voltage Vo from becoming the high level voltage.

(Fifth Embodiment)

An electric power generating system according to a fifth embodiment is described with reference to FIGS. 9 and 10.

The portions including comparator 8 to the transistor 6 of the system according to the first embodiment are replaced in the system according to this embodiment.

When the phase voltage Vac (which has generally rectangular waves) exceeds the reference voltage V1, the comparator 8 sends pulse voltages cyclically to the input terminal C of a counter 91, which counts the pulse voltages (that is, the frequency of the phase voltage Vac). The counter 91 is reset by a pulse generated by an oscillator 92. Therefore, the counter 91 counts in a period between two successive pulses generated by the oscillator.

The number counted by the counter 91 is compared with a preset digital number (threshold value of the frequency) stored in a register 93 by a coincidence circuit 94 bit by bit, and sends a high level voltage to the set terminal of a RS flip-flop circuit 95 when the number counted by the counter 91 coincides with the preset digital number. The output signal voltage Va of the RS flip-flop circuit 95 holds a high level voltage until the next reset pulse is applied to the reset terminal R. The output signal voltage Va holds the inverted Q terminal of an RS flip-flop circuit 96 in the low level voltage so that the transistor 6 applies the high level voltage to the base of the switching transistor 7 to supply the field current to the field coil. The output signal voltage Va is applied to the transistor 80 through the resistor r7, thereby turning on the transistor 80 to cause the capacitor C2 discharge and apply the low level voltage to the reset terminal R of the RS flip-flop circuit 96.

If the frequency of the phase voltage Vac is low and the coincidence circuit 94 does not generate the high level voltage (coincidence signal), the Q terminal of the RS flip-flop circuit 95 holds the low level voltage and the transistor 80 is held nonconductive for a long time (a plurality of the pulse cycles of the oscillator 92) after resetting by the oscillator 92. As a result, the capacitor C2 is charged through the resistor r2. When the terminal voltage of the capacitor C2 exceeds a resetting threshold voltage Vrth of the R terminal of the RS flip-flop circuit 96, the inverted Q terminal of the RS flip-flop circuit 96 generates the high level voltage so that the transistor 6 turns off to cut the field current. According to this embodiment, the resistor r2 and the capacitor C2 are set so that the field current is cut only when the counted number does not coincide with the preset digital number for a period of a plurality of the pulse cycles of the oscillator 92. Accordingly, even if noise signals are applied to the circuit for a short period, the circuit operation is not affected by the noise signals. Further, since the circuit according to this embodiment starts to supply the field current only when the frequency of the phase voltage Vac exceeds the threshold value, the above described leak current does not affect the operation of the circuit.

Because the frequency of the phase voltage Vac is related to the engine speed, it is possible to start the power generation after the engine operation is detected stable.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A vehicular electric power generation system including an engine and a battery, said system comprising:
    an engine-driven generator having a rotor with a field coil and a stator with phase windings, said rotor having a permanent magnet for supplying magnetic flux to said stator thereby ensuring that generation rises to a start-up voltage level at a low speed range;
    means for detecting the start-up voltage level;
    means, connected to said detecting means, for supplying a field current to said field coil only when said start-up voltage level is detected; and
    a voltage regulator for regulating an output voltage of said generator to a predetermined voltage by controlling said field current.

2. A vehicular electric power generation system as claimed in claim 1, wherein said rotor comprises a pair of pole cores each having a plurality of claw poles extending axially so that claw poles of one pole core mesh claw poles of the other claw poles alternately to form alternately different magnetic poles of said rotor; and said permanent magnet is disposed in a space between said claw poles so as to prevent leakage magnetic flux generated by said field coil through said space.

3. A vehicular electric power generation system as claimed in claim 1, wherein:

said detecting means comprises a voltage detecting means for detecting a voltage generated in one of said phase windings.

4. A vehicular electric power generation system as claimed in claim 3, wherein:

said detecting means comprises a detecting coil disposed in the same portion as said one of said phase windings.

5. A vehicular electric power generation system as claimed in claim 3, wherein:

said voltage detecting means generates a signal when said voltage of said phase winding exceeds a reference voltage.

6. A vehicular electric power generation system as claimed in claim 3, wherein: said voltage detecting means generates a signal when said voltage of said phase winding exceeds a reference voltage and decreases to a voltage lower than said reference voltage in a predetermined period.

7. A vehicular electric power generation system as claimed in claim 3, wherein:

said voltage detecting means generates a signal when a frequency of said phase voltage exceeds a predetermined number.

8. A vehicular electric power generation system as claimed in claim 1, wherein said field current supplying means cuts said field current when said phase voltage stays lower than a reference voltage for a predetermined time.

9. A vehicular electric power generation system as claimed in claim 1, wherein said rotor has a nonmagnetic holder for holding said permanent magnet therein.

10. A vehicular electric power generation system as claimed in claim 2, wherein said space between said claw poles has width which decreases toward outside in radial direction to hold said permanent magnet.

11. A vehicular electric power generation system as claimed in claim 1, wherein said rotor comprises:

a shaft;

a permanent magnet rotor having a first and second rotor halves carried tandem by said shaft, and also a magnetic yoke 139, said first rotor half having a first and second cores and a first permanent magnet which are disposed between said first and second cores, said second rotor half having a third and fourth cores and a second permanent magnet which are disposed between said third and fourth cores; and an exciting-coil type rotor having first and second cores, a field coil and a magnetic yoke; said permanent magnet rotor and said exciting coil type rotor are carried tandem by said shaft.

\* \* \* \* \*